United States Patent [19]
Fischer

[11] Patent Number: 5,460,336
[45] Date of Patent: Oct. 24, 1995

[54] RECORDING AND/OR REPRODUCING APPARATUS FOR A RECORD CARRIER IN THE FORM OF A TAPE

[75] Inventor: Karl Fischer, Perchtoldsdorf, Austria

[73] Assignee: U.S. Philips Corporation, New York, N.Y.

[21] Appl. No.: 161,954

[22] Filed: Dec. 2, 1993

[30] Foreign Application Priority Data

Feb. 11, 1993 [AT] Austria ........................................ 248/93

[51] Int. Cl.$^6$ ..................................................... G11B 15/18
[52] U.S. Cl. ........................................................... 242/356.4
[58] Field of Search ................................. 242/352, 352.5, 242/356, 356.3, 356.4; 360/96.1, 96.3, 96.5

[56] References Cited

U.S. PATENT DOCUMENTS

| | | | |
|---|---|---|---|
| 3,373,951 | 3/1968 | Mazoyer | 242/356.4 X |
| 3,877,074 | 4/1975 | Güttinger | 242/356.4 X |
| 4,206,488 | 6/1980 | Nakayawa et al. | 360/96.1 |
| 4,531,168 | 7/1985 | Suzuki | 360/96.1 |
| 4,962,436 | 10/1990 | Bayer et al. | 242/356 |
| 4,964,589 | 10/1990 | Okada | 242/356.4 X |
| 5,211,066 | 5/1993 | Koga et al. | 242/349 X |

*Primary Examiner*—John P. Darling
*Attorney, Agent, or Firm*—Brian Wieghaus

[57] ABSTRACT

A magnetic tape apparatus includes a forward drive wheel which is coaxial with a forward winding mandrel, a reverse drive wheel which is coaxial with a reverse winding mandrel, and a drive device for driving the forward drive wheel and the reverse drive wheel. The drive device has a drive shaft which can be set to different operating positions. The drive shaft includes a friction-wheel drive portion for driving a friction-wheel portion of the forward drive wheel, and a toothed-wheel drive portion for driving a toothed-wheel portion of the reverse drive wheel. In addition, the drive device can drive the forward drive wheel via a toothed-wheel portion thereof, for which purpose the drive device has a toothed-wheel drive which can be set to a fast-forward driving position in which it is in mesh both with a toothed-wheel drive portion of the drive shaft and with the toothed-wheel portion of the forward drive wheel.

21 Claims, 7 Drawing Sheets

RECORDING AND/OR REPRODUCING APPARATUS FOR A RECORD CARRIER IN THE FORM OF A TAPE

BACKGROUND OF THE INVENTION

The invention relates to a recording and/or reproducing apparatus for a record carder in the form of a tape which extends between two juxtaposed rotatable reel hubs, which apparatus includes a forward winding mandrel and a reverse winding mandrel for driving the two reel hubs, a forward drive wheel which is in driving engagement with the forward winding mandrel and which has a friction-wheel portion via which it can be driven in a "normal forward" mode, a reverse drive wheel which is in driving engagement with the reverse winding mandrel and which has a toothed-wheel portion via which it can be driven in a "fast reverse" mode, and a drive means for driving the forward drive wheel and the reverse drive wheel, the drive means comprising a drive shaft which can be driven by a motor, which is disposed substantially in an area between the two drive wheels, and which can be set to different operating positions, which drive shaft comprises a friction-wheel drive portion which, in a normal-forward driving position of the drive shaft, can drive the friction-wheel portion of the forward drive wheel in the "normal forward" mode, and a toothed-wheel drive portion which, in a fast-reverse driving position of the drive shaft, can drive the toothed-wheel portion of the reverse drive wheel in the "fast reverse" mode, the drive means in addition being capable of driving the forward drive wheel in a "fast forward" mode.

Such an apparatus is known as a so-called pocket dictation machine which has been marketed by Philips Electronics N.V. under the type designation LFH 0596. In the "fast forward" mode of this known apparatus the forward drive wheel is driven by the same parts of the drive means as in the "normal forward" mode. In the "fast forward" mode, in the same way as in the "normal forward" mode, the friction-wheel drive portion of the drive shaft, which shaft can be driven by means of the motor, is brought into driving engagement with the friction-wheel portion of the forward drive wheel in that the drive shaft is also moved into its normal forward driving position in the "fast forward" mode, but in the "fast forward" mode the motor is connected to a non-regulated comparatively high supply voltage produced by batteries whereas in the "normal forward" mode the motor is connected to a regulated comparatively low supply voltage. The non-regulated supply voltage is only about twice as high as the regulated supply voltage, so that in the "fast forward" mode the motor and, consequently, the forward drive wheel is driven only about twice as fast as in the "normal forward" mode, as a result of which the speed of the forward drive wheel in the "fast forward" mode is rather limited. This leads to a comparatively slow transport of the record carrier in the "fast forward" mode, which in its turn results in an undesirably long rewind time. Moreover, the use of the friction-wheel drive portion of the drive shaft and the friction-wheel portion of the fast-forward drive wheel in the "fast forward" mode also results in a comparatively low efficiency being attainable in the "fast forward" mode, which is a disadvantage particularly if the motor is powered by batteries, because as a result of a low efficiency only comparatively short operating times are obtainable with such batteries.

SUMMARY OF THE INVENTION

It is an object of the invention to improve an apparatus of the type defined in the opening paragraph, in such a manner that the in the "fast forward" mode the forward drive wheel is driven with an advantageously high efficiency and with an advantageously high speed.

To this end, the invention is characterized in that the forward drive wheel has a toothed-wheel portion, and the drive means comprises a toothed-wheel drive which is movable between a non-driving position and a fast-forward driving position in which said toothed-wheel drive, when the drive shaft is not in its normal-forward driving position and not in its fast-reverse driving position, is in mesh both with a toothed-wheel drive portion of the drive shaft and with the toothed-wheel portion of the forward drive wheel to drive the last-mentioned wheel in the "fast forward" mode.

The construction in accordance with the invention makes it possible that in the "fast forward" mode the forward drive wheel can also be driven with a high efficiency, because driving is effected by means of a toothed-wheel drive guaranteeing a high efficiency, and also with a comparatively high speed for which a desired value can be selected via the transmission ratio of the toothed-wheel drive. In a particularly simple manner this results in short rewind times in the "fast forward" mode and in comparatively long operating times (battery life) for the apparatus if it is battery-powered. Another special advantage is that with the construction in accordance with the invention the drive shaft, which is used in any case for driving the forward drive wheel in the "normal forward" mode and for driving the reverse drive wheel in the "fast reverse" mode and which for this purpose comprises a friction-wheel drive portion and at least one toothed-wheel drive portion, is also used for driving the toothed-wheel drive of the drive means in order to drive the forward drive wheel in the "fast forward" mode, so that the desired goal can be accomplished with a simple drive means comprising only a few additional parts.

The drive shaft of the drive means may comprise a separate toothed-wheel drive portion for driving the toothed-wheel drive. However, it has proved to be very advantageous if in its fast-forward driving position the toothed-wheel drive is in mesh with that toothed-wheel drive portion of the drive shaft which, in the fast-reverse operating position of the drive shaft, can drive the toothed-wheel portion of the reverse drive wheel in the "fast reverse" mode. In this way the toothed-wheel drive portion of the drive shaft serves a double purpose, i.e. to drive the forward drive wheel in the "fast forward" mode and also to drive the reverse drive wheel in the "fast reverse" mode, another advantage being that the construction of the drive means can be as compact as possible in the axial direction of the drive shaft.

The toothed-wheel drive may be constructed in various manners. However, it has proved to be very advantageous if the toothed-wheel drive comprises two toothed wheels which are coaxial with one another, which have mutually different diameters and which are interlocked in rotation. This results in a very simple construction of the toothed-wheel drive.

In this context it has also proved to be very advantageous if in the fast-forward driving position of the toothed-wheel drive the toothed wheel having the larger diameter is in mesh with the toothed-wheel drive portion of the drive shaft and the toothed wheel having the smaller diameter is in mesh with the toothed-wheel portion of the forward drive wheel. This is advantageous for a maximal speed of the forward drive wheel in the "fast forward" mode because it is possible to obtain favourable transmission ratios by means of such a toothed-wheel drive.

In an embodiment as defined above it has further proved to be very advantageous if in the fast-forward driving position of the toothed-wheel drive the toothed wheel having the smaller diameter is in mesh with a toothed-wheel portion formed by inner teeth of the forward drive wheel, which is then cup-shaped. This is very advantageous for a very compact construction of the drive means in the axial direction.

BRIEF DESCRIPTION OF THE DRAWINGS

The invention will be described in more detail hereinafter with reference to the drawings, which show an exemplary embodiment to which the invention is not limited.

DETAILED DESCRIPTION OF THE PREFERRED EMBODIMENTS

Figure 1:
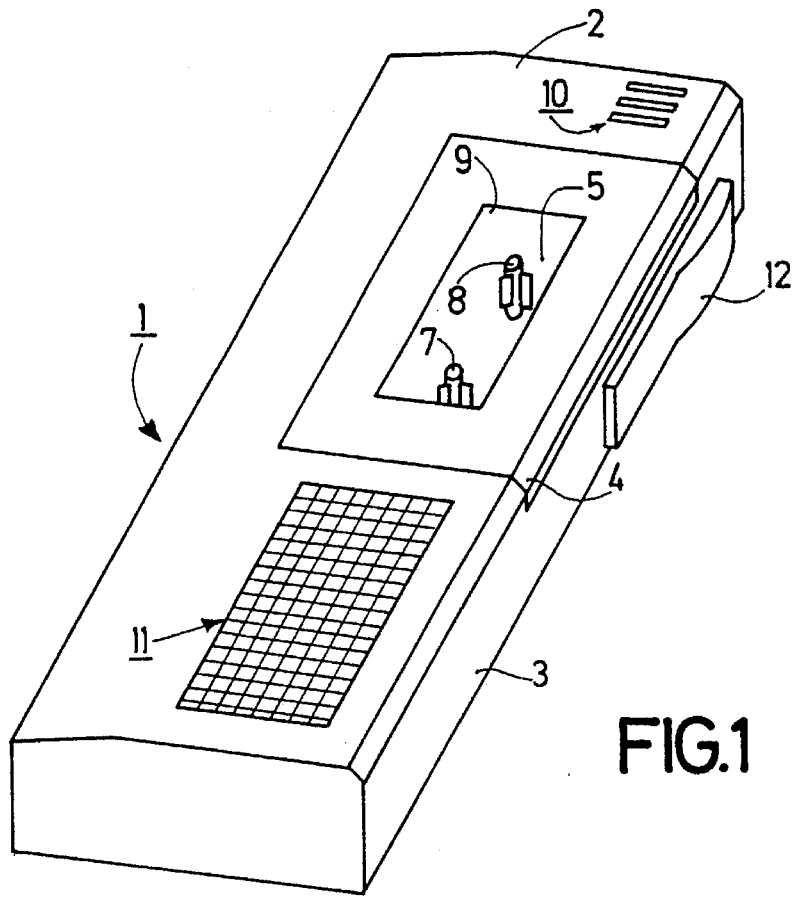
FIG. 1 is a substantially full-scale oblique view of a pocket dictation machine which forms an embodiment of a recording and reproducing apparatus in accordance with the invention and which is adapted to receive a cassette accommodating a record carrier in the form of a tape.
Figure 2:
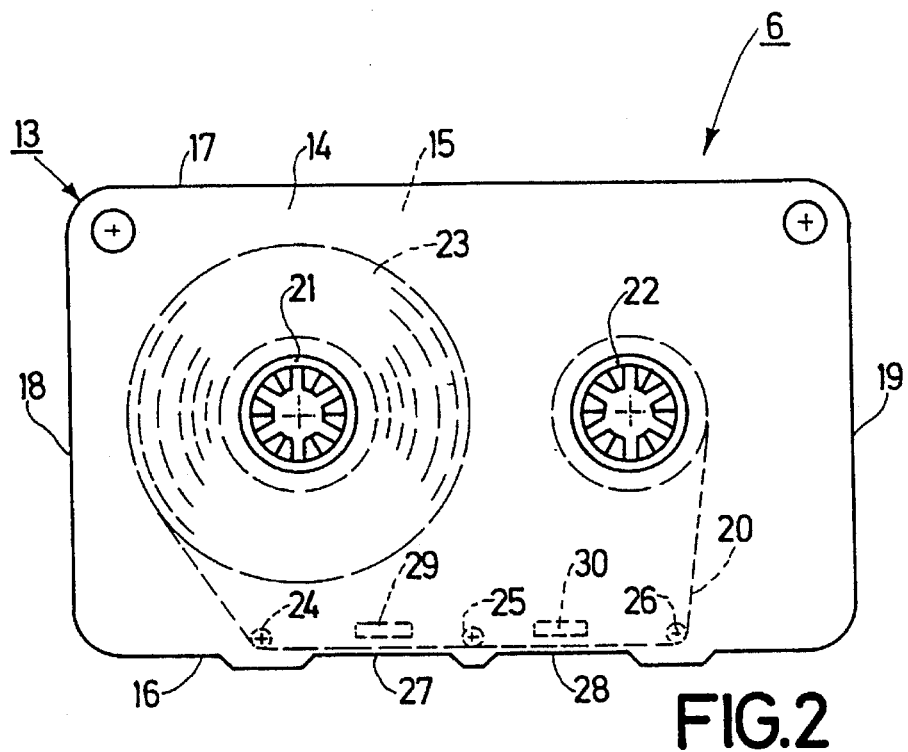
FIG. 2 is a partly diagrammatic plan view to a larger than full-size scale, showing a cassette suitable for use in the apparatus shown in FIG. 1.

FIG. 1 shows a recording and reproducing apparatus 1 constructed as a pocket dictation machine for recording and reproducing speech signals. The apparatus 1 has a cover 4, which is pivotably mounted at the upper side 2 of the apparatus and extends into a long narrow apparatus side 3 visible in FIG. 1, for closing a cassette compartment 5, into which a cassette 6 as shown in FIG. 2 and accommodating a record carrier in the form of a magnetic tape can be inserted with its longitudinal axis parallel to the longitudinal axis of the apparatus 1. FIG. 1 illustrates a situation in which there is no cassette in the cassette compartment 5. A forward winding mandrel 7 and a reverse winding mandrel 8 project from the lower part of the apparatus into the cassette compartment 5 and are visible through a transparent window 9 of the cover 4. In its upper side 2 the apparatus has a row 10 of sound transmission slots, behind which a built-in microphone is disposed in the apparatus 1, and a diagrammatically shown pattern 11 of sound transmission apertures behind which a built-in loudspeaker is disposed in the apparatus 1. At its long narrow side 3 visible in FIG. 1 the apparatus 1 has a slide button 12 which is slidable in the longitudinal direction of this narrow side 3 to start tape transport modes of the apparatus 1. The slide button 12 can be moved to and fro by hand between four operating positions, which four positions in succession correspond to the tape-transport modes "fast reverse", "stop", "normal forward" and "fast forward".

The cassette 6 has a rectangular housing 13 comprising a first cassette main side 14, visible in FIG. 2, a second cassette main side 15, not visible in FIG. 2, a long narrow front side 16, a long narrow rear side 17, a short narrow left-hand side 18 as viewed in FIG. 2, and a short narrow right-hand side 19 as viewed in FIG. 2. For the storage of speech signals the cassette 6 accommodates a record carder in the form of a magnetic tape 20, two juxtaposed rotatably drivable reel hubs 21 and 22 being rotatably mounted between the two cassette main sides 14 and 15 for taking up the magnetic tape 20. At its ends the magnetic tape 20 is attached to the reel hubs 21 and 22 and in the cassette 6 shown in FIG. 2 it has been wound completely onto the reel hub 21 to form a tape spool 23. The magnetic tape 20 extends from the spool 23 on the reel hub 21 to the other reel hub 22 via three cylindrical tape guides 24, 25 and 26. By means of the tape guides 24, 25 and 26 the magnetic tape 20 is guided along the long narrow cassette side 16, in which two openings 27 and 28 are provided. At the location of the two openings 27 and 28 two pressure felts 29 and 30 are arranged so as to be movable in a manner not shown, by means of which felts the magnetic tape 20 can be pressed against the head faces of two magnetic heads 31 and 32 of the apparatus, which magnetic heads can be brought into scanning contact with the magnetic tape 20 through the two openings 27 and 28. The two magnetic heads 31 and 32, which are shown diagrammatically in FIG. 3, comprise a magnetic erase head 31 for erasing speech signals on the magnetic tape 20 and a magnetic recording and reproducing head 32 for recording and reproducing speech signals on/from the magnetic tape 20.

The cassette 6 can be inserted into the apparatus 1 in two mutually inverted positions, the winding mandrels 7 and 8 of the apparatus entering into driving engagement with the reel hubs 21 and 22 through one of the two cassette main sides 14 and 15 depending on the position of the cassette 6, so that with a cassette 6 present in the apparatus 1 each of the two winding mandrels 7 and 8 is in driving engagement with one of the reel hubs 21 and 22 in order to drive the magnetic tape 20. In all the tape-transport modes of the present apparatus 1 the magnetic tape 20 is driven in that only one of the two winding mandrels 7 and 8 is driven.

Figure 3:
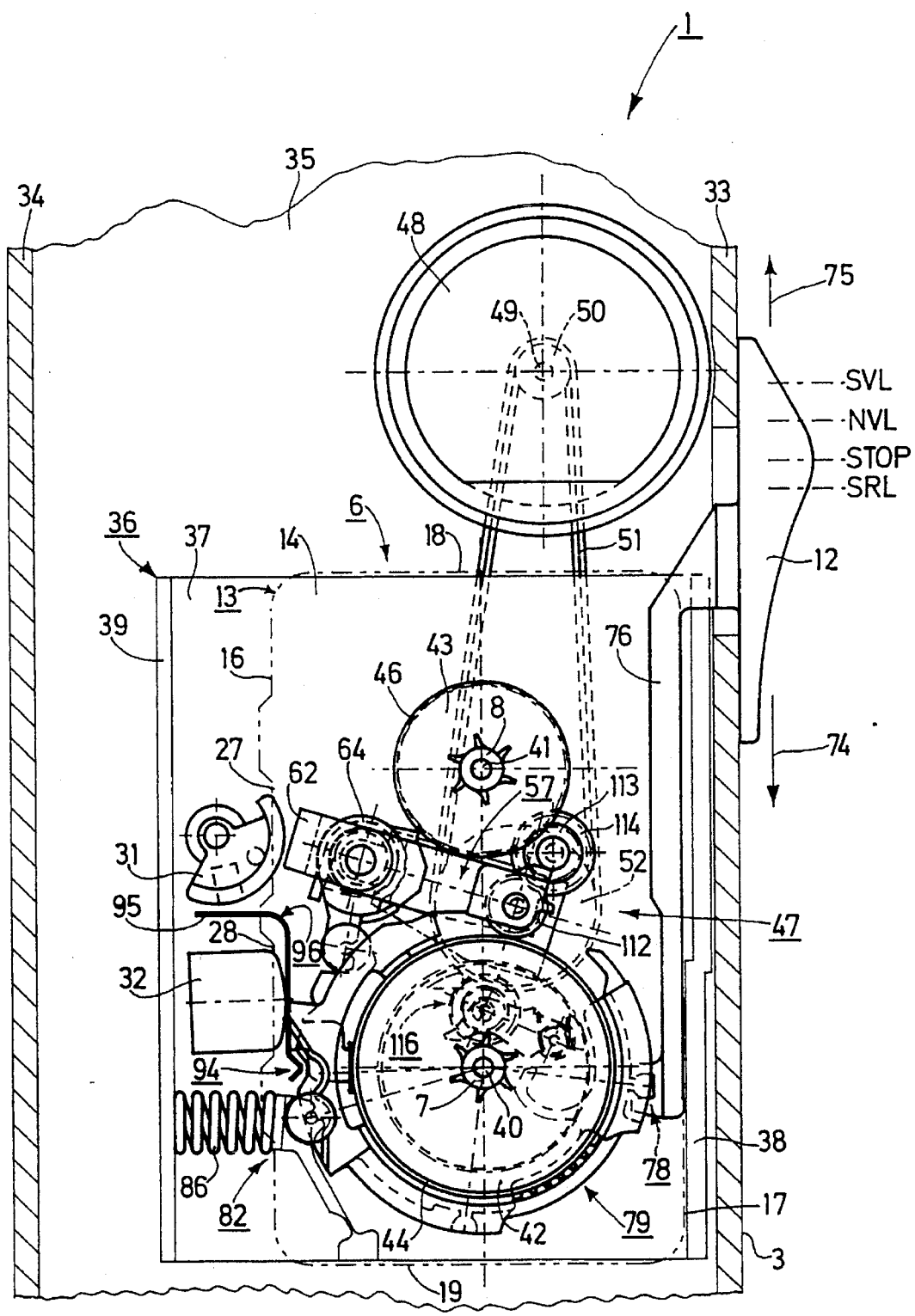
FIG. 3 shows a part of the apparatus of FIG. 1 in a slightly simplified plan view, taken to a larger scale than FIGS. 1 and 2 and with the upper part of the apparatus cut away, the shown part of the apparatus comprising a drive means for driving two drive wheels which are each in driving engagement with a winding mandrel, the movable apparatus parts shown in FIG. 3 being shown in positions occupied in a "stop" mode.
Figure 4:
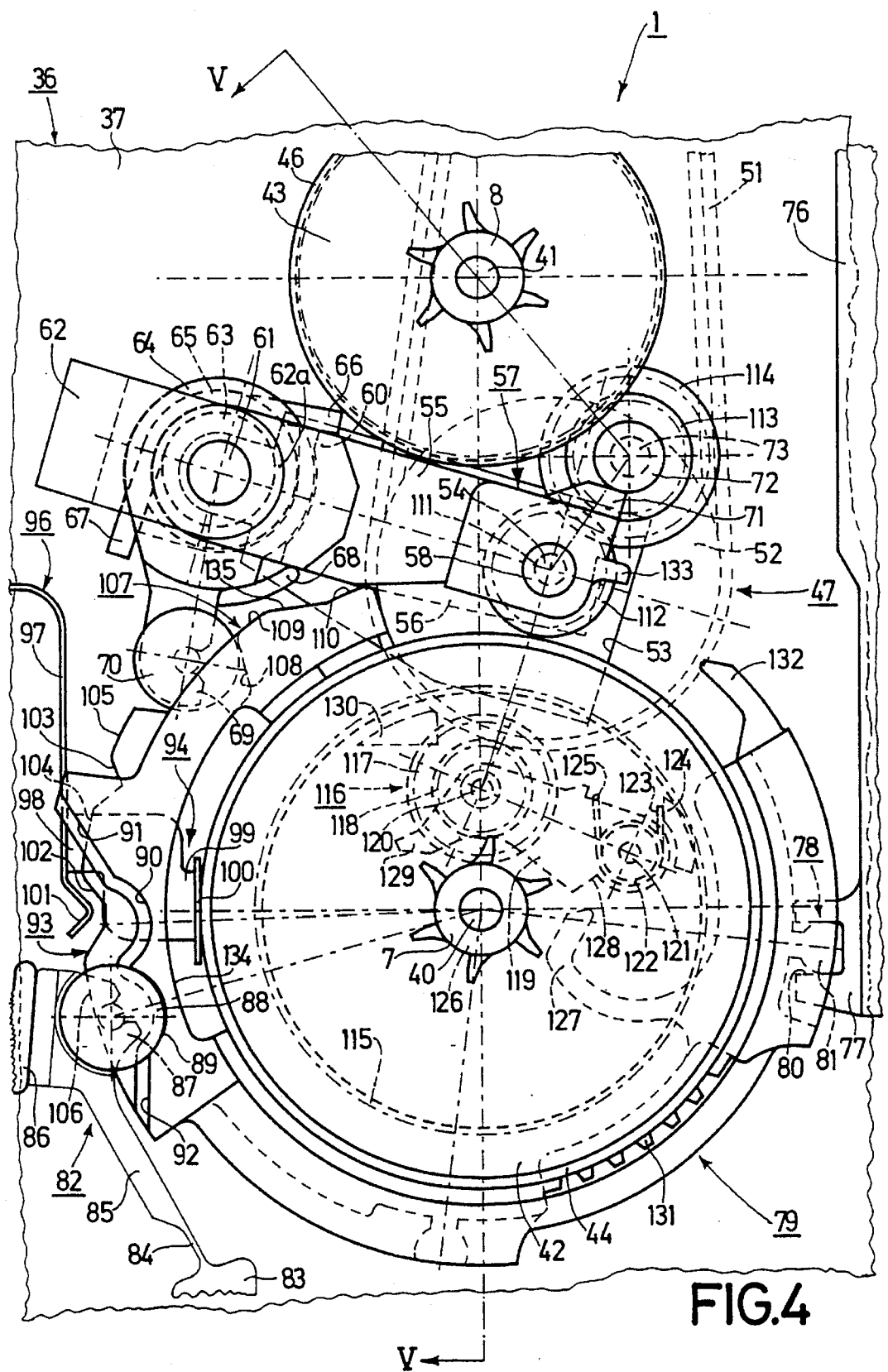
FIG. 4 is a plan view to a larger scale than FIG. 3, showing essentially the drive means of the apparatus shown in FIG. 1, the movable apparatus parts shown in FIG. 4 also being shown in the positions occupied in a "stop" mode.
Figure 5:
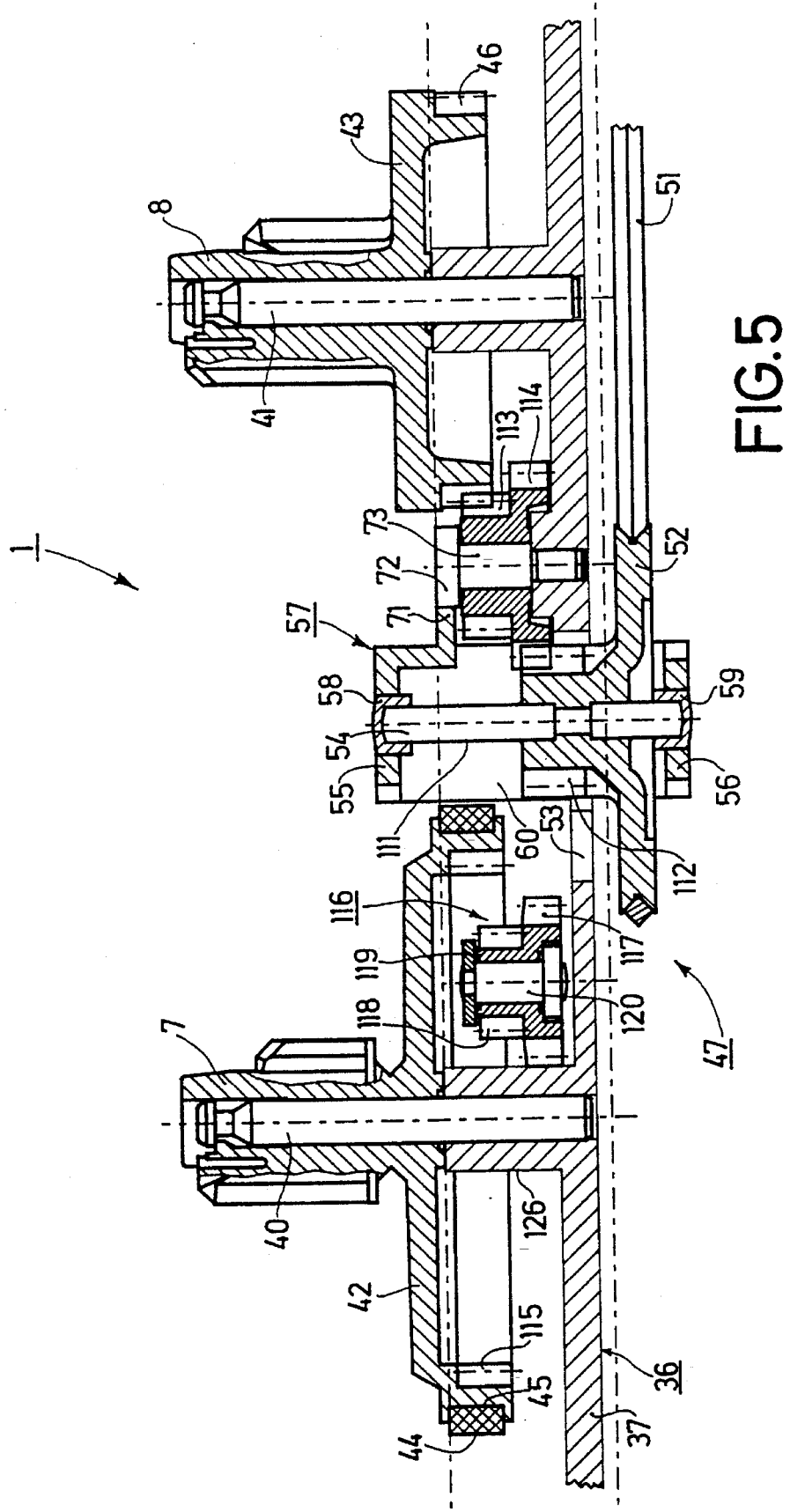
FIG. 5 shows the drive means of the apparatus of FIGS. 1 in a sectional view taken on the line V—V in FIG. 4, the movable apparatus parts shown in FIG. 5 also being shown in the positions occupied in a "stop" mode.

The part of the apparatus 1 in FIG. 1 which is relevant to the invention will be described with reference to FIGS. 3 to 8. An injection-moulded plastics chassis 36 is mounted in the space between two long side walls 33 and 34, of which the side wall 33 is situated at the long narrow side 3 of the apparatus, and a bottom wall 35 of the apparatus housing, which chassis comprises a plate-shaped chassis part 37 extending parallel to the bottom wall 35 and two strip-shaped chassis parts 38 and 39 extending substantially perpendicularly to this plate-shaped chassis part 37. Two spindles 40 and 41 are locked against rotation in the chassis part 37. The forward winding mandrel 7 is rotatably mounted on the spindle 40 and the reverse winding mandrel 8 is rotatably mounted on the spindle 41. Each of the two winding mandrels 7 and 8 is locked in rotation to one of two winding mandrel wheels 42 and 43, which are coaxial with the two winding mandrels 7 and 8, in that each of the winding mandrels 7 and 8 is integral with the respective one of drive wheels 42 and 43. The forward drive wheel 42, which is integral with the forward winding mandrel 7, is cup-shaped and at its outer circumference it has a friction-wheel portion 44 formed by a rubber ring fitted in a circumferential groove 45 in the forward drive wheel 42, as can be seen in FIG. 5. The reverse drive wheel 43, which is integral with the reverse winding mandrel 8, is also cup-shaped and at its outer circumference it has a toothed-wheel portion 46 formed by spur teeth, as can also be seen in FIG. 5. In a "normal forward" mode the forward drive wheel 42 can be driven via its friction-wheel portion 44 in a particularly steady and silent manner. In a "fast reverse" mode the reverse drive wheel 43 can be driven via its toothed-wheel portion 46 in an advantageous manner with a high efficiency and a high speed.

The apparatus 1 has a drive means 47 for driving the forward drive wheel 42 and for driving the reverse drive wheel 43. The drive means 47 includes a motor 48, which is secured to the bottom wall 35 of the apparatus housing and whose motor shaft 49 carries a pulley 50. A belt 51 runs over the pulley 50 and over a further pulley 52, which also forms a flywheel. The further pulley 52 is situated underneath the chassis part 37 and is coaxially connected and locked in rotation to a drive shaft 54 of the drive means 47, which drive shaft projects through an opening 53 in the chassis part 37, is situated essentially in an area between the two drive wheels 42 and 43, is movable into different operating positions, and can thus be rotated by the motor 48 via the belt 51 and the further pulley 52.

As can be seen in FIG. 5, the drive shaft 54 is rotatably supported by means of two bearing bushes 58 and 59 in end surfaces of two flange portions 55 and 56 of a substantially H-shaped bearing block 57. Near its bridge portion 60, which interconnects the two flange portions 55 and 56, the bearing block 57 is mounted so as to be pivotable about a spindle 61 (see FIG. 4) by means of the two flange portions 55 and 56. The spindle 61 is mounted in an L-shaped bracket-like support 62, which projects from the chassis part 37, and extends from the portion 62a of the support 62, which portion is parallel to the chassis part 37, through the upper flange portion 55 of the bearing block 57 towards the plate-shaped chassis part 37 and through the opening in this chassis part 37 into the lower flange portion 56 of the bearing block 57, which lower flange portion 56 is situated underneath the plate-shaped chassis part 37. The bridge portion 60 of the bearing block 57 also extends down to the lower flange portion 56 of the bearing block 57 through the opening 53 in the chassis part 37.

A sleeve 63 is mounted on the spindle 61 and extends parallel to the bridge portion 60 of the bearing block 57 between the ends of the flange portions 55 and 56 which are remote from the drive shaft 54, on which sleeve an actuating lever 64 for the bearing block 57 is pivotable, which lever is situated adjacent a channel-shaped part of the bridge portion 60. A leg spring 65, fitted coaxially on the sleeve 63, is pre-tensioned between the beating block 57 and the actuating lever 64 and acts on the bridge portion 60 of the bearing block 57 with a first leg 66 and on the actuating lever 64 with a second leg 67. The actuating lever 64 has a laterally projecting arcuate arm 68, which serves to limit the relative movement between the actuating lever 64 and the beating block 57 under the influence of the pre-tensioned leg spring 65 and which abuts against the bridge portion 60 of the bearing block 57 in the situation shown in FIGS. 3 and 4, which corresponds to the "stop" mode.

Figure 8:
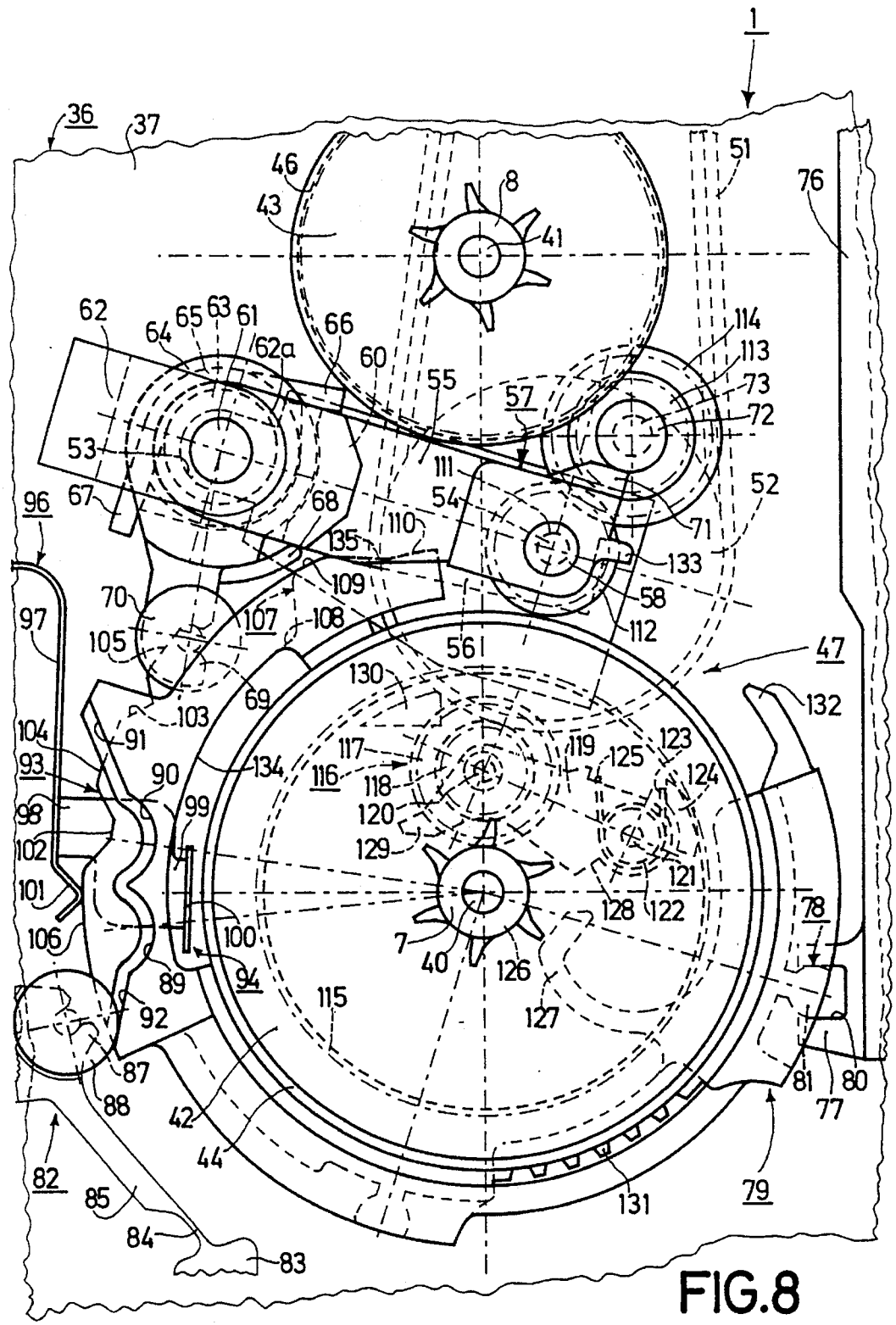
FIG. 8 in the same way as FIGS. 4, 6 and 7 shows the drive means of the apparatus of FIG. 1, the movable apparatus parts shown in FIG. 8 being shown in positions occupied in a "fast reverse" mode.

At its free end 69 the actuating lever 64 carries an actuating roller 70, which is rotatably supported on the actuating lever 64. By means of the actuating roller 70 and the actuating lever 64, when moved from their positions shown in FIGS. 3 and 4 in a clockwise direction as seen in FIGS. 3 and 4, the bearing block 57 can also be moved in a clockwise as seen in FIGS. 3 and 4 via the leg spring 65. Such a movement of the bearing block 57 is effected in opposition to the force exerted by the belt 51 passed over further pulley 52. The belt 51 consequently urges the beating block 57 with an L-shaped positioning stop 71, which projects from its upper flange portion 55 towards the chassis part 37, against a head portion 72 of a bearing spindle 73 mounted in the chassis part 37, as illustrated in FIGS. 4, 5 and 8.

In the present apparatus 1 the bearing block 57 and other movable parts of the apparatus 1 are moved upon actuation of the slide button 12 in order to start the tape-transport modes of the apparatus 1. In FIG. 3 the slide button 12 is shown in its "stop" position STOP corresponding to the "stop" mode, in which the magnetic tape 20 in the cassette 6 is not driven. From its "stop" position STOP in FIG. 3 the slide button 12 can be slid in the direction indicated by an arrow 74 into a "fast reverse" position SRL, in which the slide button 12 starts the "fast reverse" mode of the apparatus 1, in which mode the magnetic tape 20 in the cassette 6 is driven via the reverse winding mandrel 8, which is then driven by the motor 48 via the drive means 47, the motor 48 of the apparatus 1 being connected to a comparatively high non-regulated supply voltage so that the motor shaft 49 is driven with a comparatively high speed in a clockwise direction as seen in FIG. 3. However, from its "stop" position STOP in FIG. 3 the slide button 12 can also be slid in the opposite direction indicated by an arrow 75 into a "normal forward" position NVL, in which the slide button 12 starts the "normal forward" mode of the apparatus 1, in which mode the magnetic tape 20 in the cassette 6 is driven via the forward winding mandrel 7, which is then driven by the motor 48 via the drive means 47, the motor 48 of the apparatus 1 being connected to a comparatively low constant regulated supply voltage so that the motor shaft 49 is also driven in a clockwise direction as seen in FIG. 3, but with a comparatively low speed. From its "normal forward" position NVL the slide button 12 can be slid in the above-mentioned direction 75 into a "fast forward" position SVL, in which the slide button 12 starts the "fast forward" mode of the apparatus 1, in which mode the magnetic tape in the cassette 6 is driven via the forward winding mandrel 7, which is then driven by the motor 48 via the drive means 47, the motor 48 of the apparatus 1 being connected to the same comparatively high non-regulated supply voltage as in the "fast reverse" mode via the motor switch, not shown, and the motor shaft 49 being driven with the comparatively high speed in the clockwise direction as seen in FIG. 3, so that the magnetic tape 20 in the cassette 6 is driven with a higher speed of transport than in the "normal forward" mode.

The slide button 12 is connected to an actuating slide 76 which is guided so as to be movable parallel to the side wall 33 of the apparatus 1. At its end which is remote from the slide button 12 the actuating slide 76 has a lateral projection 77 and at the location of this projection 77 it is connected to a control device 79 of the apparatus 1 via a coupling device 78. The coupling device 78 is constructed as a pin-and-slot joint and comprises a slot 80 in the projection 77 of the actuating slide 76 and a pin 81 which projects from the control device 79 towards the chassis part 37. The control device 79 has a substantially sector-shaped inner portion of the same diameter as the rubber ring 44, and a sector-shaped peripheral portion connected to the inner portion. The control device 79 is coaxial with the spindle 40 and its inner portion is pivotably mounted on the spindle 40 and can be pivoted into four operating positions by means of the slide button 12, the sliding movement of the slide button 12 and the actuating slide 76 being convened into the pivotal movement of the control device 79 via the coupling device 78. The control device 79 serves for controlling the actuation of the movable parts of the apparatus 1 in accordance with the modes of operation to which the apparatus 1 can be set by means of the slide button 12. The actuation of the bearing block 57 is also controlled by means of the control device 79, as will be described in detail hereinafter.

By means of a latching device 82 the control device 79 can be locked in its operating positions corresponding to the "stop" and the "normal forward" mode, whereas in the operating positions corresponding to the "fast reverse" and the "fast forward" mode the latching device 82 urges the control device 79 towards the respective adjacent operating position corresponding to the "stop" mode and the "normal forward" mode, respectively. The latching device 82 comprises a latching lever 85, which is pivotally connected to the part 37 of the chassis 36 via a mounting block 83, which block is connected to the chassis part 37, and an integral hinge 84, said lever being loaded by a pressure spring 86, which bears on the strip-shaped part 39 of the chassis 36, and carrying a latching roller 88 at its free end 87. The spring force exerted on the latching lever 85 by the pressure spring 86 urges the latching roller 88 into a first latching recess 89 of the control device 79 in the "stop" mode of the apparatus 1, into a second latching recess 90 of the control device 79 in the "normal forward" mode of the apparatus 1, against a first reset surface 91 adjacent the second latching recess 90 in the "fast forward" mode of the apparatus 1, and against a second reset surface 92 adjacent the first latching recess 89 in the "fast reverse" mode of the apparatus 1.

The control device 79 further comprises a first control cam 93 for controlling a braking device 94 for stopping the forward drive wheel 42. The braking device 94 comprises a right-angled blade spring 96 having one leg 95 secured to the chassis part 37 of the chassis 36 and having another leg 97 connected to a brake arm 98, which projects laterally from this leg 97 and whose free end 99 carries a brake shoe 100 which extends through a passage 134 in the control device 79 up to the level of the rubber ring 44 of the forward drive wheel 42 to cooperate with the rubber ring 44. The free end portion 101 of the leg 97 of the blade spring 96 is V-shaped. The V-shaped end portion 101 is constructed and arranged for cooperation with the first control cam 93 of the control device 79. The first control cam 93 has a first actuation recess 102 to actuate the braking device 94 in the "stop" mode for continually immobilising the forward drive wheel 42 in the "stop" mode, a second actuation recess 103 to actuate the braking device 94 briefly during change-over between the "normal forward" mode and the "fast forward" mode, particularly to brake the forward drive wheel briefly during a change-over from the "fast forward" mode to the "normal forward" mode, in order to preclude looping of the tape, a first lifting surface 104 to lift the braking device 94 in the "normal forward" mode of the apparatus 1, a second lifting surface 105 to lift the braking device 94 in the "fast forward" mode of the apparatus 1, and a third lifting surface 106 to lift the braking device 94 in the "fast reverse" mode of the apparatus 1.

The control device 79 further comprises a second control cam 107 adapted to cooperate with the actuating roller 70, which roller is rotatably supported on the actuating lever 64 for the actuation of the beating block 57, and thereby control the actuation of the bearing block 57. The second control cam 107 has a first release surface 108 to release the actuating roller 70 and the bearing block 57 in the "stop" mode and the "fast reverse" mode, a first actuating surface 109 to keep the actuating roller 70 and the bearing block 57 actuated in the "normal forward" mode of the apparatus 1, a second actuating surface 135 to control the actuation of the actuating roller 70 and the bearing block 57 during a change-over between the "normal forward" mode and the "fast forward" mode, and a second release surface 110 to release the actuating roller 70 and the bearing block 57 in the "fast forward" mode of the apparatus 1. In plan view as shown in FIGS. 3, 4, 6, 7 and 8 the first release surface 108 partly coincides with a bounding wall of the passage 134, so that the release surface 108 is only partly visible in these Figures. In the operating positions corresponding to the "stop" mode and the "fast reverse" mode as shown in FIGS. 4 and 8 the actuating roller 70 is situated opposite the second control cam 107, the actuating roller 70 being lifted off the release surface 108 although, via the further pulley 52, the drive shaft 54, the bearing block 57, the leg spring 65 and the actuating lever 64, the belt 51 exerts a force on the actuating roller 70 so as to apply it to the second control cam 107. However, in the "stop" mode and the "fast reverse" mode of the apparatus 1, as is apparent from FIGS. 4 and 8, application is prevented by abutment of the positioning stop 71 of the bearing block 57 against the head portion 72 of the bearing spindle 73. However, in the "fast forward" mode of the apparatus 1, as is apparent from FIG. 7, such an application of the actuating roller 70 to the second control cam 107, i.e. to the second release surface 110, is also inhibited, as will be described in detail hereinafter.

Figure 6:
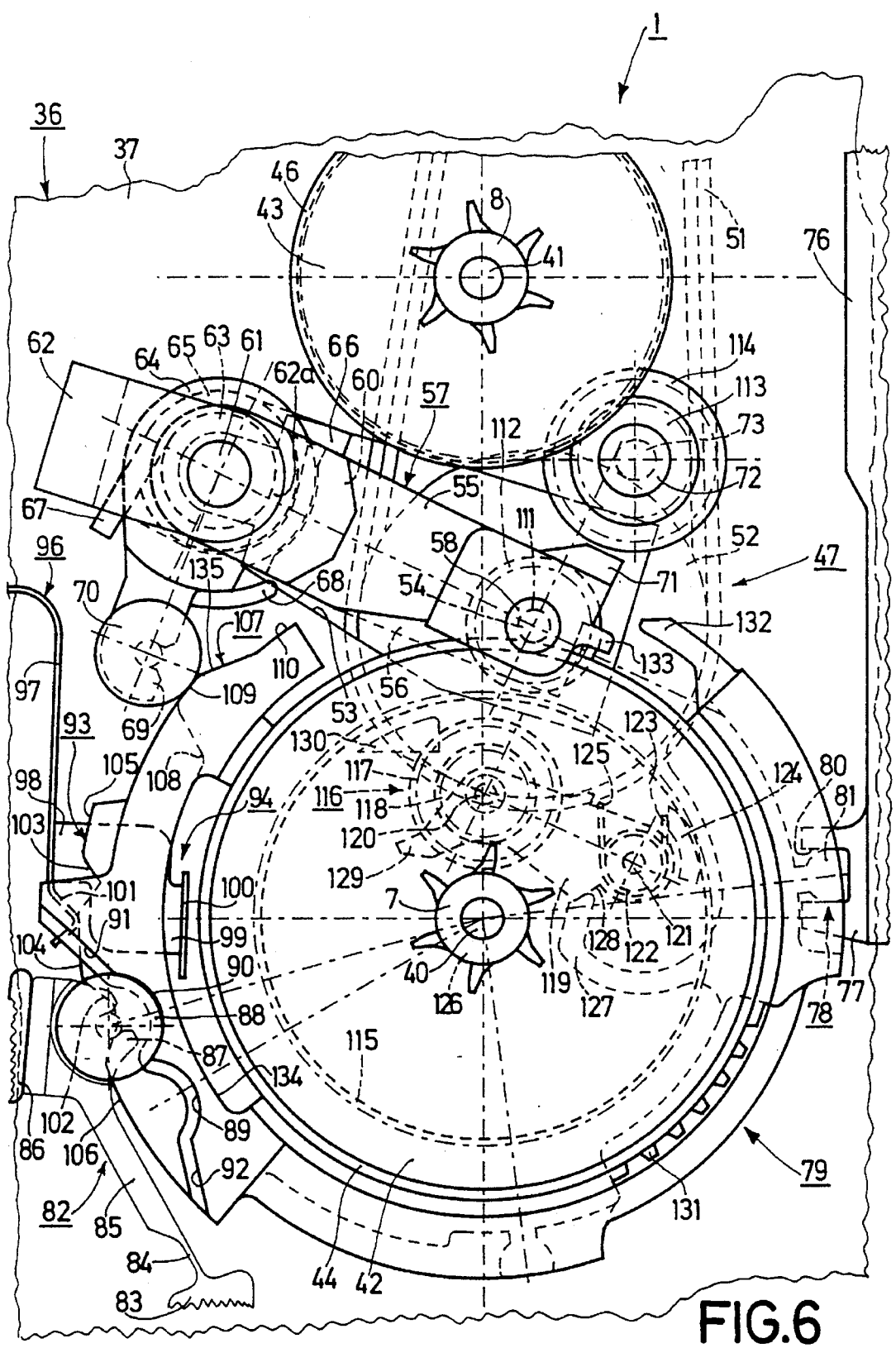
FIG. 6 in the same way as FIG. 4 shows the drive means of the apparatus of FIG. 1, the movable apparatus parts shown in FIG. 6 being shown in positions occupied in a "normal forward" mode.

As is apparent in particular from FIG. 5, but also from FIGS. 3, 4, 6, 7 and 8, the drive shaft 54 has a friction-wheel drive portion 111 which, in a normal-forward driving position of the drive shaft 54 as shown in FIG. 6, can drive the friction-wheel portion 44 of the forward drive wheel 42 in the "normal forward" mode. The drive shaft 54 further has a toothed-wheel drive portion 112, which in the present case is formed by a pinion 112 which is integral with the further pulley 52 and which extends from the further pulley 52 through the passage 53 in the chassis part 37. In a fast-reverse driving position of the drive shaft 54, as is shown in FIG. 8, the pinion 112 can drive the toothed-wheel portion of the reverse drive wheel 43 in the "fast reverse" mode. For this purpose two toothed wheels 113 and 114, which are coaxial with one another and interlocked in rotation, are rotatably supported on the chassis part 37 by means of the bearing spindle 73. Of the two coaxial toothed wheels 113 and 114 the wheel 113 having the smaller diameter is constantly in mesh with the toothed-wheel portion 46 of the reverse drive wheel 43. The other toothed wheel 114 having the larger diameter is in mesh with the pinion 112 on the drive shaft 54 in the fast-reverse driving position of the drive shaft 54, as is shown in FIG. 8. The fast-reverse driving position of the drive shaft 54 corresponds to the position of the drive shaft 54 in the "stop" mode, so that the other toothed wheel 114 is also in mesh with the pinion 112 in the "stop" mode of the apparatus 1, as is shown in FIGS. 3 and 4. The arrangement and construction of the relevant apparatus parts have been selected in such a manner that an engaging effect is obtained between the toothed wheel 114 and the pinion 112, urging the pinion 112 towards the toothed wheel 114 and thereby amplifying the force exerted by the belt 51.

The drive means 47 can, in addition, drive the forward drive wheel 42 in a "fast forward" mode. In addition to its friction-wheel portion 44 the forward drive wheel 42 in the present apparatus 1 comprises for this purpose a toothed-wheel portion 115. In the apparatus 1 this toothed-wheel portion 115 is formed by inner teeth of the cup-shaped forward drive wheel 42. In the apparatus 1 the drive means 47 further comprises a toothed-wheel drive 116 movable between a non-driving position shown in FIGS. 3, 4, 5, 6 and 8 and a fast-forward driving position shown in FIG. 7, in which said toothed-wheel drive, when the drive shaft 54 is not in its normal-forward driving position and not in its fast-reverse driving position, is in mesh both with a toothed-wheel drive portion of the drive shaft 54 and with the toothed-wheel portion, i.e. with the inner teeth 115, of the forward drive wheel 42 to drive the latter in the "fast forward" mode. The construction used in the apparatus 1 is suitably such that in its fast-forward driving position the toothed-wheel drive 116 is in mesh with that tooth-wheel drive portion of the drive shaft 54, which then occupies a fast-forward driving position, i.e. with the pinion 112, which in the fast-reverse driving position of the drive shaft 54 can drive the toothed-wheel portion 46 of the reverse drive wheel 43 in the "fast reverse" mode.

In the apparatus 1 the toothed-wheel drive 116 very simply comprises two mutually coaxial toothed wheels 117 and 118 having different diameters and interlocked in rotation. The two coaxial toothed wheels 117 and 118 are supported on a supporting lever 119 so as to be rotatable about a spindle 120. The supporting lever 119 is supported on the chassis part 37 of the chassis 36 so as to be pivotable about a spindle 121. A leg spring 122, fitted coaxially around the spindle 121, has a leg 123 acting against a stop 124 which projects from the chassis part 37, and another leg 125 acting against the supporting lever 119. Consequently, the leg spring 122 tends to move the supporting lever 119 anti-clockwise as viewed in FIG. 4 and to keep the toothed-wheel drive 116 in its non-driving position, in which the toothed wheel 117 having the larger diameter is supported on a bearing bush 126 for the spindle 40, which bush is coaxial with this spindle 40 and integral with the chassis 36.

To control the actuation of the supporting lever 119 in order to move the toothed-wheel drive 116 between its non-driving position and its fast-forward driving position the control device 79 has a resilient angular arm 127 which projects from the device towards the spindle 40. When the control device 79 is moved from the position shown in FIGS. 3 and 4 into the position shown in FIG. 7 in the anti-clockwise direction viewed in FIGS. 3 and 4 the arm 127 engages a notch 128 in the supporting lever 119, as a result of which the supporting lever 119 together with the toothed-wheel drive 116 is pivoted from the non-driving position shown in FIG. 4 into the fast-forward driving position shown in FIG. 7, in which a positioning arm 129 of the supporting lever 119 abuts against a further positioning stop 130, which projects from the chasms part 37.

Figure 7:
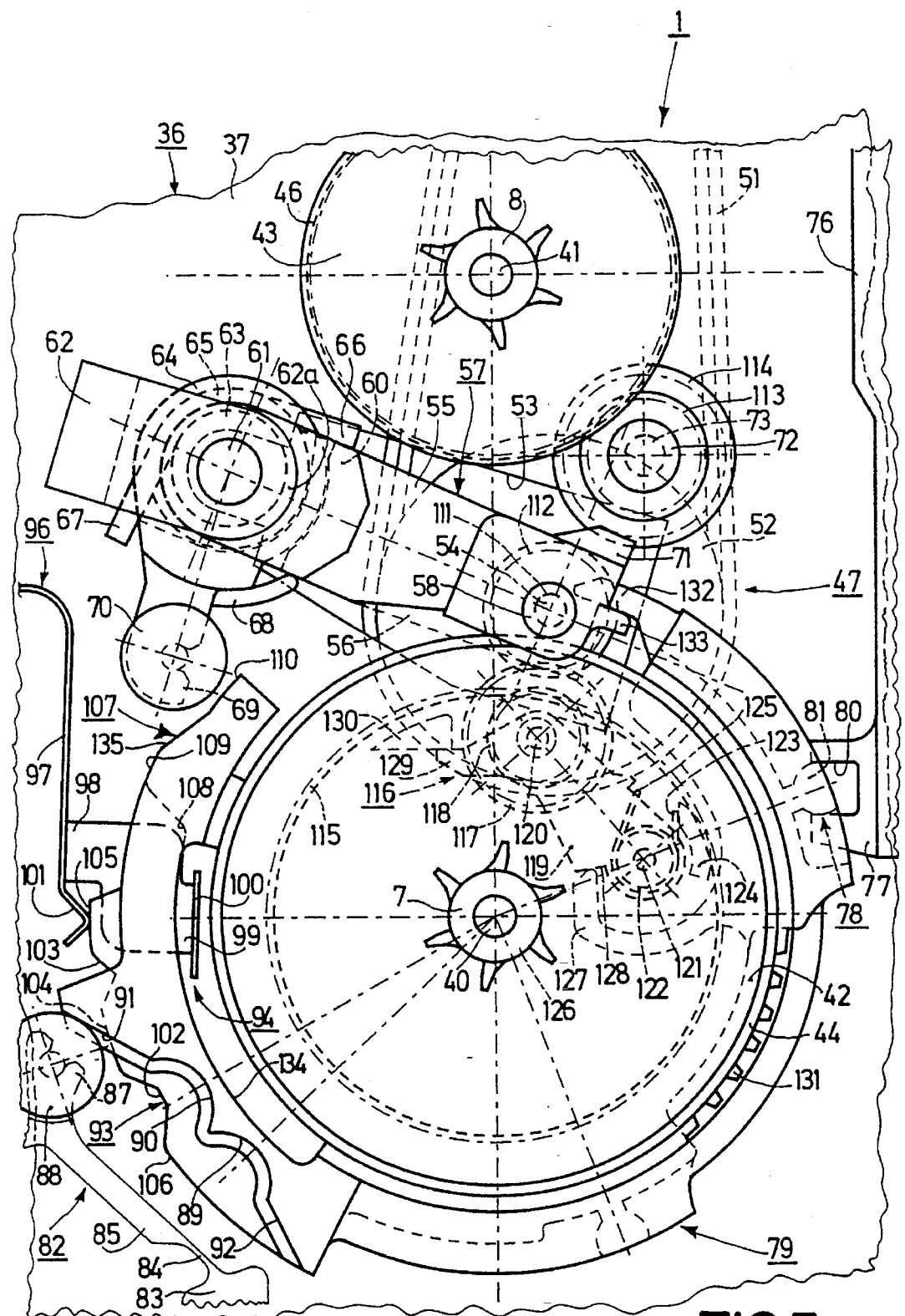
FIG. 7 in the same way as FIGS. 4 and 6 shows the drive means of the apparatus of FIG. 1, the movable apparatus parts shown in FIG. 7 being shown in positions occupied in a "fast forward" mode.

The control device 79 further comprises a tooth-shaped stop 132. This stop 132 serves to cooperate with a projection 133 of the beating block 57, which projects from the flange portion 55 towards the chassis part 37, in the "fast forward" mode of the apparatus 1. When the "fast forward" mode is started the control device 79 is pivoted anti-clockwise viewed in FIGS. 3, 4, 6, 7 and 8. As a result of the pulling action of the belt 51 the actuating roller 70 then rolls from the first actuating surface 109 onto the second actuating surface 135, which adjoins the second release surface 110, the belt 51 causing the bearing block 57 to be pivoted towards the reverse drive wheel 43 during the cooperation between the actuating roller 70 and the second actuating surface 135, and in addition the tooth-shaped stop 132 is pivoted towards the projection 133 of the bearing block 57. The construction is such that the stop 132 has already properly engaged behind the projection 133 before the actuating roller 70 reaches the second release surface 110. In this way it is achieved that in the "fast forward" mode of the apparatus 1 the stop 132 engages behind the projection 133, as is shown in FIG. 7. Thus, the drive shaft 54 including its pinion 112 is set to its fast-forward driving position, the projection 133 being held against the stop 132 of the control device 79 under the influence of the force exerted by the belt 51, which force acts upon the bearing block 57 via the further pulley 52 and the drive shaft 54.

When the toothed-wheel drive 116 is in its fast-forward driving position and the drive shaft 54 with its pinion 112 is also in its fast-forward driving position the drive means 47 can drive the forward drive wheel 42 via its toothed-wheel portion 115 very simply and advantageously with a high efficiency and with a high speed.

It is to be noted that the control device 79 also comprises a toothed portion 131. By means of this toothed portion 131 the afore-mentioned motor switch can be switched over via a toothed wheel, not shown, to supply different voltages, already mentioned hereinbefore, to the motor 48 of the apparatus 1 in accordance with the operating positions of the control device 79.

The operation of the apparatus 1 will be outlined briefly hereinafter.

To start the "normal forward" mode the slide button 12 is slid from its "stop" position STOP to its "normal forward" position NVL in the direction indicated by the arrow 75. As a result, the control device 79 is pivoted from the operating position shown in FIG. 4 into the operating position shown in FIG. 6, the latching roller 88 of the latching device 82 first being pushed out of the latching recess 89 and subsequently being pushed into the other latching recess 90. This pivotal movement of the control device 79 also renders the first lifting surface 104 of the first control cam 93 active, so that the braking device 94 is lifted and, as consequence, the brake shoe 100 releases the forward drive wheel 42 to allow driving. Moreover, when the control device 79 is pivoted the actuating roller 70 is applied to the first release surface 108 of the second control cam 107, after which the actuating roller 70 rolls along the first release surface 108 onto the first actuating surface 109, as a result of which the actuating roller 70 and, via the actuating lever 64 and the leg spring 65, the bearing block 57 is pivoted so far that the friction-wheel drive portion 111 of the drive shaft 54 enters into driving engagement with the rubber ring 44 of the forward drive wheel 42. The actuating lever 64 is then pivoted so far that its arm 68 is lifted off the bearing block 57 and the pre-tensioned leg spring 65 is tensioned even further, as a result of which the friction-wheel drive portion 111 of the drive shaft 54 is pressed against the rubber ring 54 by the force of the leg spring 65. As a result of the pivotal movement of the control device 79 its resilient arm 127 enters into contact with supporting lever 119 at the location of the notch 128 in this lever but this only gives rise to a very small displacement of the supporting lever 119 with the toothed-wheel drive 116, so that the larger toothed wheel 117 is lifted only slightly off the bearing bush 126. Owing to the pivotal movement of the control device 79 the motor switch, not shown, is changed over via the toothed portion 131, the motor 48 then being connected to the motor voltage required for carrying out the "normal forward" mode. The motor 48, via the drive means 47, i.e. particularly the friction-wheel drive portion 111 of the drive shaft 54 and the rubber ring 44 if the forward drive wheel 42, then drives the forward winding mandrel 7 and, consequently, the magnetic tape 20 in a cassette 6 in the "normal forward" mode in a particularly steady and silent manner. After the "normal forward" mode has been started the latching device 82 locks the control device 79 in its operating position corresponding to the "normal forward" mode.

If subsequently the apparatus 1 is to be set to, for example, the "fast forward" mode the slide button 12 is slid from its "normal forward" position NVL into its "fast forward" position SVL in the direction indicated by the arrow 75. As a result, the control device 79 is pivoted from the operating position shown in FIG. 6 into the operating position shown in FIG. 7. The latching roller 88 of the latching device 82 then enters into cooperation with the first reset surface 91, the force exerted on the latching device 82 by the pressure spring 86 causing the latching roller 88 to exert a force on the first reset surface 91, which tends to pivot the control device 79 back into its operating position corresponding to the "normal forward" mode. When the control device 79 is pivoted into its operating position corresponding to the "fast forward" mode as shown in FIG. 7 the V-shaped end portion 101 of the blade spring 96 of the braking device 94 briefly cooperates with the second actuation recess 103 of the first control cam 93, as a result of which the forward drive wheel 42 is braked briefly, which in the present case has no practical significance. Subsequently, the second lifting surface 105 of the first control cam 93 becomes active, so that the braking device 94 is lifted and, consequently, the forward drive wheel 42 can be driven. Moreover, when the control device 79 is pivoted the actuating roller 70 rolls from the first actuating surface 109 of the second control cam 93 towards the second release surface 110 via the second actuating surface 135, as a result of which the belt 51 pubs the bearing block 57 towards the reverse drive wheel 43 but this pivotal movement of the bearing block 57 is limited by the cooperation of the projection 133 of the bearing block with the stop 132 of the control device 79, so that eventually the drive shaft 54 is set to its fast-forward driving position. During the pivotal movement of the control device 79 the resilient arm 127 further causes the supporting lever 119 to be pivoted, as a result of which the toothed-wheel drive 116 is set from its non-driving position into its fast-forward driving position, in which the larger toothed wheel 117 meshes with the pinion 112 on the drive shaft 54 and the smaller toothed wheel 118 meshes with the inner teeth 115 of the forward drive wheel 42. During this pivotal movement of the control device 79 the motor switch, not shown, is changed over via the toothed portion 131, the motor 48 then being connected to the motor voltage required for carrying out the "fast forward" mode. The motor 48, via the drive means 47, i.e. particularly the pinion 112 on the drive shaft 54, the toothed-wheel drive 116 and the inner teeth 115 of the forward drive wheel 42, then drives the forward winding mandrel 7 and, consequently, the magnetic tape 20 in a cassette 6 in the "fast forward" mode with a high efficiency and a high speed. The slide button 12 should be held by hand while the apparatus 1 is in the "fast forward" mode.

As soon as the slide button 12 is released by the user of the apparatus 1 while in the "fast forward" mode the latching roller 88, via the first reset surface 91, will urge the control device 79 from its operating position corresponding to the "fast forward" mode in FIG. 7 into the operating position corresponding to the "normal forward" mode in FIG. 6, all the apparatus parts controlled by the control device 79 then being reset to the positions corresponding to the "normal forward" mode and the slide button 12 being also moved back into its "normal forward" position NVL in a direction opposite to that indicated by the arrow 75. During this pivotal movement of the control device 79 the V-shaped end portion 101 of the blade spring 96 of the braking device 94 cooperates briefly with the second actuation recess 103 of the second control cam 93, so that the forward drive wheel 42 is braked briefly, thereby precluding an annoying and undesirable looping of the tape in a cassette 6 during a change-over from the "fast forward" mode to the "normal forward" mode.

To turn off the "normal forward" mode of the apparatus 1 the control device 79 must be pivoted back to its operating position corresponding to the "stop" mode in FIG. 4 by correspondingly moving the slide button 12 in a direction opposite to that indicated by the arrow 75 so as to surmount the force exerted by the latching device 82. When the control device 79 is pivoted into its operating position corresponding to the "stop" mode all the apparatus parts controlled by the control device 79 are reset to their positions corresponding to the "stop" mode and by means of the toothed portion 131 of the control device 79 the motor switch, not shown, is changed over, as a result of which no supply voltage is applied to the motor 48 and the motor is stopped. Since all the apparatus pans controlled by the control device 79 are reset to their positions corresponding to the "stop" mode the pinion 112 on the drive shaft 54 meshes again with the toothed wheel 114, which by means of the coaxial toothed wheel 113 is in mesh with the teeth 46 of the reverse drive wheel 43, so that the motor 48, which runs out briefly, briefly drives the reverse winding mandrel 8 via the restored drive, resulting in a brief automatic return movement of the magnetic tape 20 in a cassette 6. In the operating position of the control device 79 corresponding to the "stop" mode the first actuation recess 102 of the first control cam 93 for the braking device 94 is operative, as a result of which the forward drive wheel 42 is immobilised, and in this context it is to be noted that, in order to preclude looping, the braking operation controlled by the first actuation recess 102 already begins before the motor 48 is disconnected as mentioned above.

In order to set the apparatus 1 to the "fast reverse" mode the slide button 12 should be moved from its "stop" position STOP into its "fast reverse" position SRL in the direction indicated by the arrow 74. As a result, the control device 79 is pivoted clockwise from the operating position shown in FIG. 4 into its operating position shown in FIG. 8. The latching roller 88 of the latching device 82 then cooperates with the second reset surface 92, so that under the load of the pressure spring 86 the latching roller 88 exerts a force on the control device 79 which tends to reset the control device 79 from its operating position corresponding to the "fast reverse" mode in FIG. 8 into the operating position corresponding to the "stop" mode in FIG. 4. When the control device 79 is pivoted into its operating position corresponding to the "fast reverse" mode, the third lifting surface 106 of the first control cam 93 becomes active, as a result of which the braking device 94 is lifted and the forward drive wheel 42 is consequently released to be driven. The bearing block 57 is not moved during this pivotal movement of the control device 79 because the actuating roller 70 is at the location of the first release surface 108 of the second control cam 107. In the "fast reverse" mode the bearing block 57 and the drive shaft 54, which is rotatably supported on this bearing block 57, therefore remain in the same position as in the "stop" mode, so that the pinion 112 on the drive shaft 54 remains in mesh with the toothed wheel 114 and, consequently, the drive transmission to the teeth 46 of the reverse drive wheel 43 is maintained via the coaxial toothed wheel 113. When the control device 79 is pivoted the motor switch, not shown, is changed over via the toothed portion 131 to apply the motor voltage required for the "fast reverse" mode to the motor 48. The motor 48, via the drive means 47, i.e. particularly the pinion 112 on the drive shaft 54, the two coaxial toothed wheels 113 and 114, and the teeth 46 of the reverse drive wheel 43, then drives the reverse winding mandrel 8 and, consequently, the magnetic tape 20 in a cassette 6 in the "fast reverse" mode with a high efficiency and a high speed. The slide button 12 should be held by hand while the apparatus 1 is in the "fast reverse" mode.

As soon as the slide button 12 is released by the user of the apparatus 1 while this is in the "fast reverse" mode the latching roller 88, which is loaded by the pressure spring 86, pivots the control device 79 back from the operating position corresponding to the "fast reverse" mode in FIG. 8 into the operating position corresponding to the "stop" mode in FIG. 4, all the apparatus parts controlled by the control device 79 being reset to their positions corresponding to the "stop" mode and the slide button 12 being also reset to its "stop" position STOP in a direction opposite to that indicated by the arrow 74. When the control device 79 is pivoted back the motor switch, not shown, is changed over via the toothed portion 131, as a result of which no supply voltage is applied to the motor 48 and the motor is stopped. In the operating position of the control device 79 corresponding to the "stop" mode the first actuation recess 102 of the first control cam 93 for the braking device 94 is operative, as a result of which the forward drive wheel 42 is immobilised, and in this context it is to be noted that, in order to preclude looping, the braking operation controlled by the first actuation recess 102 already begins before the motor 48 is disconnected as mentioned above.

The invention is not limited to the exemplary embodiment described above. For example, the drive shaft may alternatively be provided with two pinions of different diameter, one for driving the forward drive wheel in the "fast forward" mode and the other one for driving the reverse drive wheel in the "fast reverse" mode. The toothed-wheel drive for driving the forward drive wheel in the "fast forward" mode may also be of another construction and may be constituted, for example, by a single toothed wheel, the toothed-wheel portion of the forward drive wheel then being formed by outer teeth which are offset in the axial direction of the forward drive wheel relative to the friction-wheel portion of this wheel and whose outer diameter is smaller than that of the friction wheel portion. In the embodiment of the apparatus described above no braking device has been provided for the reverse drive wheel. However, for the reverse drive wheel there may also be provided a braking device which can be controlled by the control device, which is advantageous in order to ensure that no looping of the tape occurs during a change-over from the "fast forward" mode to the "normal forward" mode and from the "fast forward" mode to the "stop" mode.

I claim:

1. A magnetic tape apparatus, comprising:
   a forward winding mandrel and a reverse winding mandrel;
   a forward drive wheel in driving engagement with the forward winding mandrel, the forward drive wheel including a friction-wheel portion and a toothed-wheel portion;
   a reverse drive wheel in driving engagement with the reverse winding mandrel and including a toothed-wheel portion; and
   a drive means for driving the forward drive wheel and the reverse drive wheel, the drive means comprising a rotatable drive shaft disposed substantially in an area between the two drive wheels and moveable between different operating positions, said drive shaft comprising a friction-wheel drive portion which, in a normal-forward driving position of the drive shaft, drives the friction-wheel portion of the forward drive wheel, and a toothed-wheel drive portion which, in a fast-reverse driving position of the drive shaft, drives the toothed-wheel portion of the reverse drive wheel, and said drive means further comprising a toothed-wheel drive movable between a non-driving position and a fast-forward driving position in which said toothed-wheel drive, when the drive shaft is not in its normal-forward driving position and not in its fast-reverse driving position, is in mesh both with the toothed-wheel drive portion of the drive shaft and with the toothed-wheel portion of the forward drive wheel to drive the forward drive wheel at a rotational speed faster than the rotational speed in the normal-forward driving position of the drive shaft.

2. An apparatus as claimed in claim 1, characterized in that in said fast-forward driving position, the toothed-wheel drive is in mesh with that toothed-wheel drive portion of the drive shaft which, in the fast-reverse operating position of the drive shaft drives the toothed-wheel portion of the reverse drive wheel.

3. An apparatus as claimed in claim 2, characterized in that the toothed-wheel drive comprises two coaxial toothed wheels interlocked in rotation, one of said toothed wheels having a larger diameter and the other toothed wheel having a smaller diameter.

4. An apparatus as claimed in claim 3, characterized in that in the fast-forward driving position of the toothed-wheel drive the toothed wheel having the larger diameter is in mesh with the toothed-wheel drive portion of the drive shaft and the toothed wheel having the smaller diameter is in mesh with the toothed-wheel portion of the forward drive wheel.

5. An apparatus as claimed in claim 4, characterized in that the forward drive wheel has an inner set of teeth, and in the fast-forward driving position of the toothed-wheel drive the toothed wheel having the smaller diameter is in mesh with said inner teeth of the forward drive wheel.

6. An apparatus as claimed in claim 1, characterized in that the toothed-wheel drive comprises two coaxial toothed wheels interlocked in rotation, one of said toothed wheels having a larger diameter and the other toothed wheel having a smaller diameter.

7. An apparatus as claimed in claim 6, characterized in that in the fast-forward driving position of the toothed-wheel drive the toothed wheel having the larger diameter is in mesh with the toothed-wheel drive portion of the drive shaft and the toothed wheel having the small diameter is in mesh with the toothed-wheel portion of the forward drive wheel.

8. An apparatus as claimed in claim 7, characterized in that the forward drive wheel has an inner set of teeth, and in the fast-forward driving position of the toothed-wheel drive the toothed wheel having the smaller diameter is in mesh with said inner teeth of the forward drive wheel.

9. A magnetic tape apparatus for a magnetic tape cassette having a length of tape extending between a pair of reel hubs, said apparatus comprising:
- a. a forward winding mandrel and a reverse winding mandrel, each for driving a respective reel hub of the tape cassette;
- b. a forward drive wheel in driving engagement with said forward winding mandrel, said forward drive wheel including a friction-wheel portion and a toothed-wheel portion;
- c. a reverse drive wheel in driving engagement with said reverse winding mandrel, said reverse drive wheel including a toothed-wheel portion;
- d. a rotatable drive shaft disposed substantially between said drive wheels and moveable among a fast-reverse driving position, a normal-forward driving position, and a fast-forward driving position between the normal-forward and fast-reverse driving positions, said drive shaft including a friction-wheel portion and a toothed-wheel portion, in the normal forward driving position of said drive shaft said friction-wheel portion of said drive shaft engaging said friction-wheel portion of said forward drive wheel and in the fast-reverse position of said drive shaft said toothed-wheel portion of said drive shaft meshing with said toothed-wheel portion of said reverse drive wheel, and in the fast forward driving position said drive shaft not engaging either of said drive wheels;
- e. a pivotable lever adjacent said forward drive wheel; and
- f. a fast-forward toothed drive wheel rotatably mounted on said pivotable lever, said pivotable lever being movable between (i) a non-driving position in which said fast-forward toothed drive wheel is not in engagement with said toothed-wheel portion of said forward drive wheel and (ii) a fast-forward position in which said fast-forward toothed-wheel is in engagement with said toothed-wheel portion of said forward winding wheel and with said toothed-wheel portion of said drive shaft in the fast-forward position of said drive shaft.

10. A magnetic tape apparatus according to claim 9, wherein said forward winding wheel has an inner facing surface comprising said toothed-wheel portion of said forward winding wheel.

11. A magnetic tape cassette apparatus according to claim 10, further comprising biasing means for biasing said pivotable lever into said non-driving position and a control device for moving said pivotable lever into said fast-forward position of said pivotable lever.

12. A magnetic tape cassette apparatus according to claim 11, further including an electric motor coupled to said drive shaft for rotatably driving said drive shaft at a first and a second, higher speed, and said control device includes means for switching said motor to said second, higher speed when said control device moves said pivotable lever to said fast-forward position.

13. A magnetic tape cassette apparatus according to claim 12, wherein said fast-forward drive wheel includes two rotationally interlocked coaxial wheel portions, one of said wheel portions having a larger diameter and the other of said wheel portions having a smaller diameter, and the portion having the smaller diameter engages the inner, toothed-wheel portion of the forward winding wheel and the portion having the larger diameter engages the toothed-wheel portion of the drive shaft.

14. A magnetic tape cassette apparatus according to claim 9, wherein said fast-forward wheel includes two rotationally interlocked coaxial wheel portions, one of said wheel portions having a larger diameter and the other of said wheel portions having a smaller diameter, and the portion having the smaller diameter engages the toothed-wheel portion of the forward winding wheel and the portion having the larger diameter engages the toothed-wheel portion of the drive shaft.

15. A magnetic tape cassette apparatus according to claim 9, further comprising biasing means for biasing said pivotable lever into said non-driving position and a control device for moving said pivotable lever into said fast-forward position of said pivotable lever.

16. A magnetic tape cassette apparatus according to claim 9, further including an electric motor coupled to said drive shaft for rotatably driving said drive shaft at a first and a second, higher speed, and said control device includes means for switching said motor to said second, higher speed when said control device moves said pivotable lever to said fast-forward position.

17. A magnetic tape cassette apparatus according to claim 9, wherein said forward winding wheel circumscribes an area in a plan view thereof, and said pivotable lever is situated entirely within said area between said non-driving and fast-forward positions thereof.

18. A magnetic tape cassette apparatus according to claim 17, further including a second pivotable lever carrying said drive shaft and pivotably mounted generally between said forward and reverse winding wheels to move said drive shaft into said normal-forward, fast-forward and fast-reverse positions.

19. A pocket dictation machine, comprising:
- a. a forward winding mandrel for driving a reel hub of a tape cassette;
- b. a forward drive wheel in driving engagement with said forward winding mandrel, said forward drive wheel including a friction-wheel portion and a toothed-wheel portion;
- c. a rotatable drive shaft disposed adjacent said forward drive wheel and moveable between a normal forward driving position and a fast-forward driving position, said drive shaft including a friction-wheel portion and a toothed-wheel portion, in the normal-forward driving position of said drive shaft said friction wheel portion driving said friction-wheel portion of said forward drive wheel and in the fast-forward driving position said friction-wheel portion of said drive shaft not engaging either of said drive wheels; and
- d. a fast-forward toothed drive wheel movable between (i) a non-driving position in which said fast-forward toothed drive wheel is not in engagement with said toothed-wheel portion of said forward drive wheel and (ii) a fast-forward position in which said fast-forward toothed-wheel is in engagement with said toothed-wheel portion of said forward winding wheel and with said toothed-wheel portion of said drive shaft in the fast-forward position of said drive shaft.

20. A pocket dictation machine according to claim 19, further comprising:

a motor coupled to said drive shaft for driving said drive shaft at a first and a second, higher rotational speed; and a control means for controlling said motor such that (i) in the normal-forward position of said drive shaft, with said friction wheel portion of said drive shaft and of said forward winding wheel in driving engagement, said motor drives said drive shaft at said first speed and (ii) in the fast-forward position of said drive shaft and of said fast-forward drive wheel, with said toothed-wheel portions of said drive shaft and fast-forward drive wheel in engagement, said motor drives said drive shaft at said second, higher speed.

21. A magnetic tape cassette apparatus according to claim 20, wherein said forward winding wheel circumscribes an area in a plan view thereof, the toothed-wheel portion of said forward drive wheel is on an inner surface thereof, said apparatus further includes a pivotable lever carrying said fast-forward drive wheel and moveable between a non-driving position in which said fast forward wheel is not in mesh with said inner, toothed-wheel portion of said forward winding wheel and a fast-forward position in which said fast-forward wheel is in mesh with said inner, toothed-wheel portion of said fast-forward wheel, and said pivotable lever is situated entirely within said area between said non-driving and fast-forward positions thereof.

* * * * *